Aug. 21, 1923.
C. F. HENRY
1,465,303
MILLING MACHINE
Filed Sept. 10, 1921
3 Sheets-Sheet 1
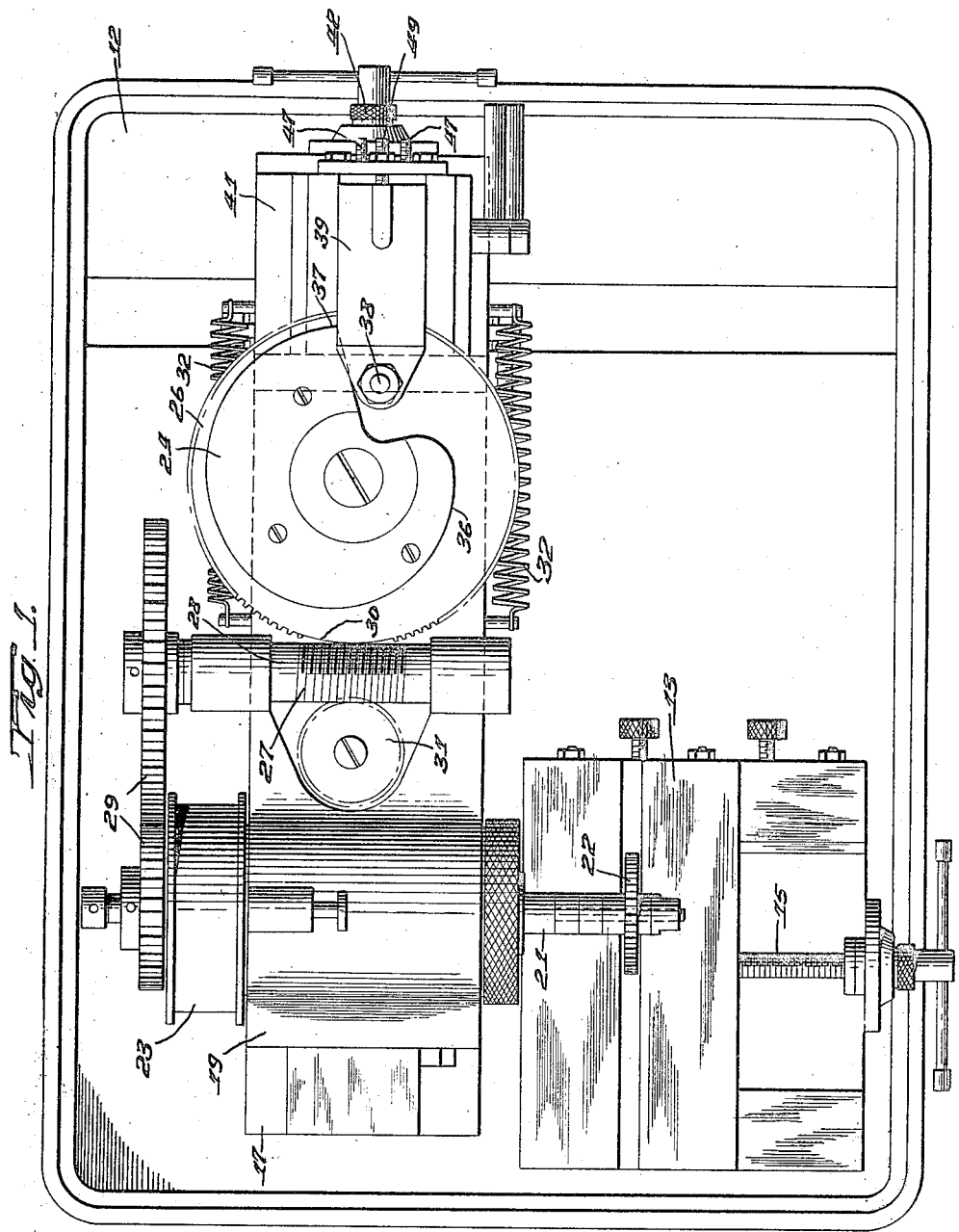

Aug. 21, 1923.
C. F. HENRY
MILLING MACHINE
Filed Sept. 10, 1921
1,465,303
3 Sheets-Sheet 2
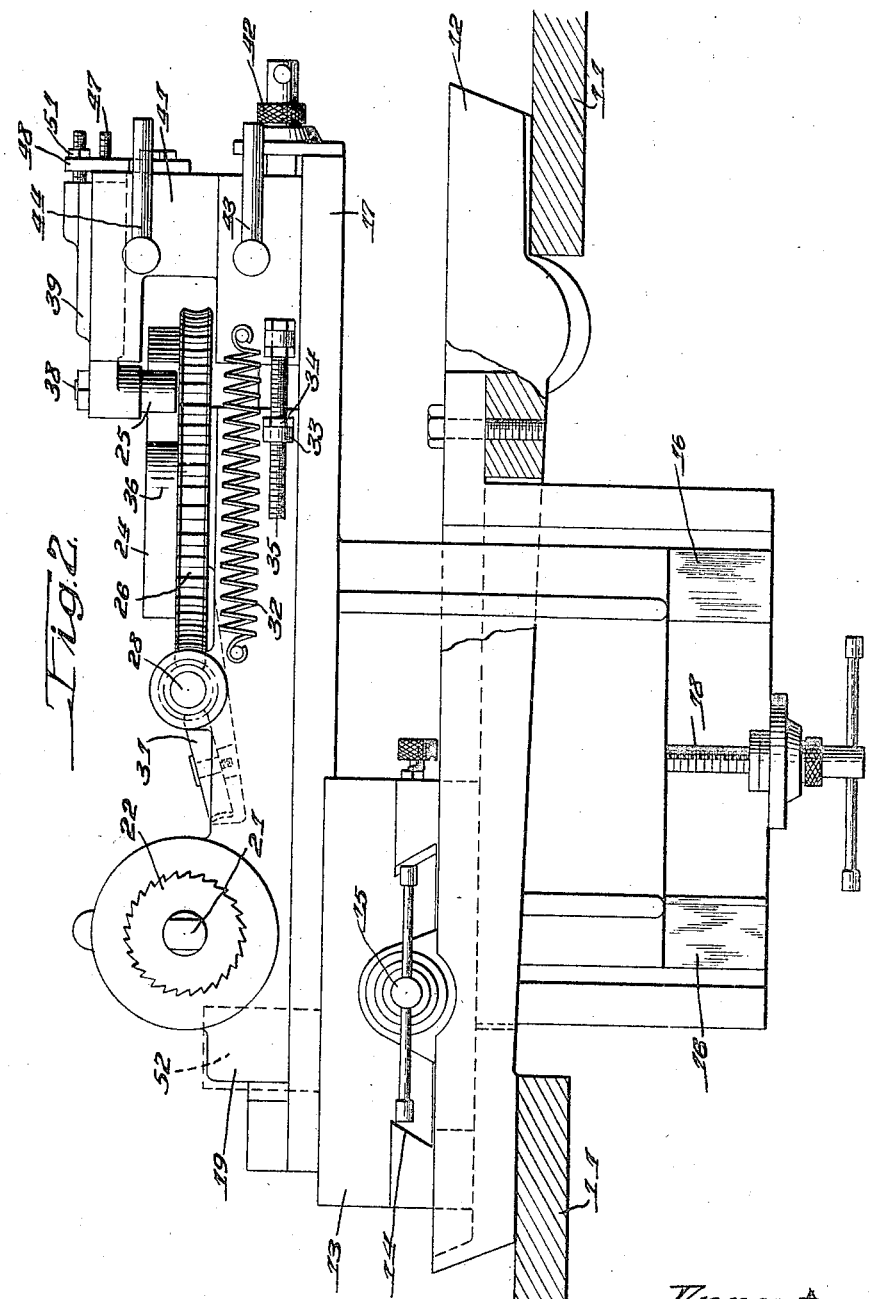

Aug. 21, 1923.
C. F. HENRY
1,465,303
MILLING MACHINE
Filed Sept. 10, 1921     3 Sheets-Sheet 3
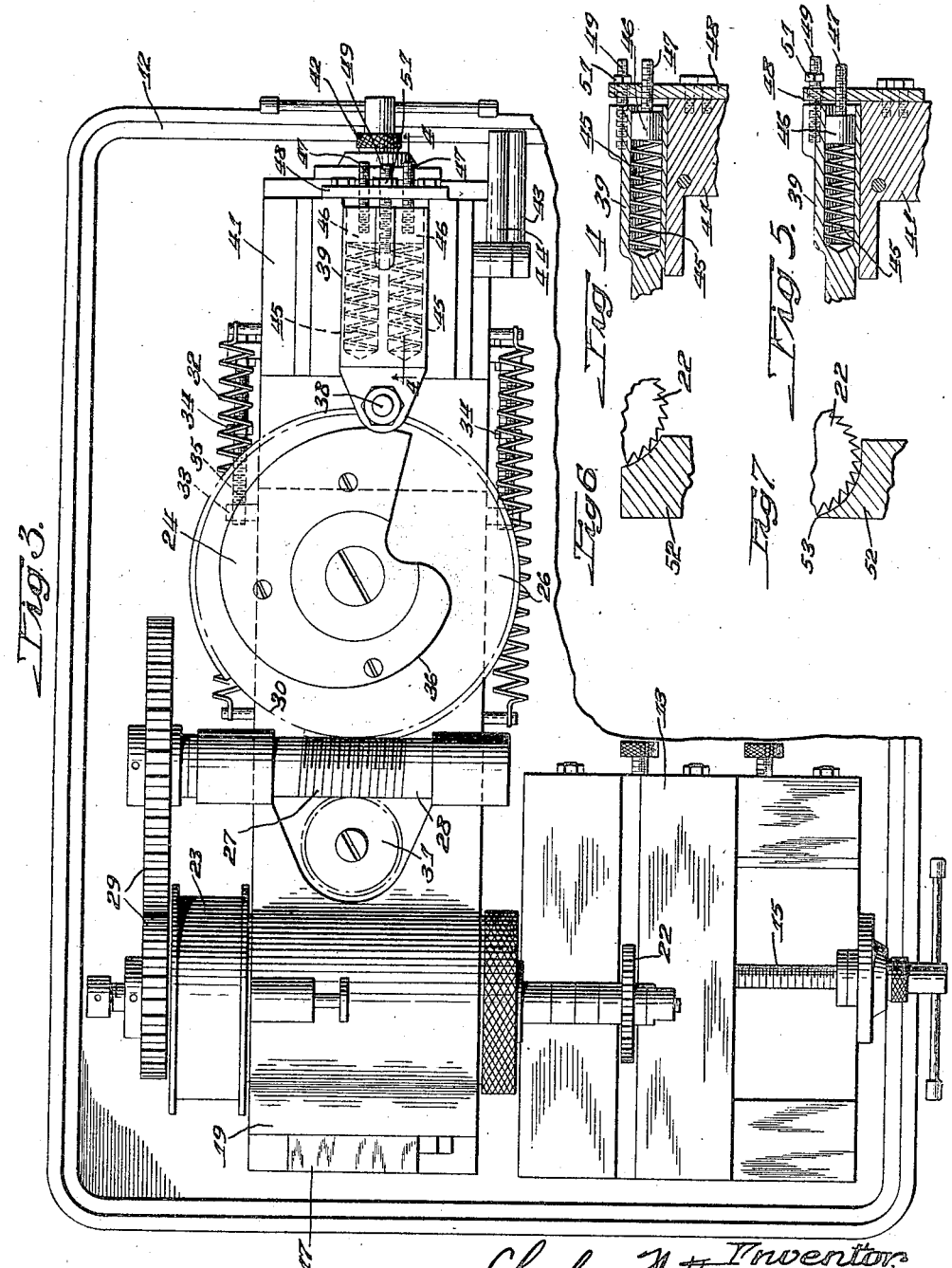

Patented Aug. 21, 1923.

1,465,303

UNITED STATES PATENT OFFICE.

CHARLES F. HENRY, OF BELVIDERE, ILLINOIS.

MILLING MACHINE.

Application filed September 10, 1921. Serial No. 499,606.

*To all whom it may concern:*

Be it known that I, CHARLES F. HENRY, a citizen of the United States, residing at Belvidere, in the county of Boone and State of Illinois, have invented certain new and useful Improvements in Milling Machines, of which the following is a specification.

This invention relating in general to the art of milling machines, contemplates the provision of a single-purpose milling machine adapted to perform straight-cut milling operations. More particularly, it is designed to take the place of the more expensive standard and universal milling machines in cases where simply a straight milling operation is required.

The primary object of my invention, therefore, is to provide a generally simplified and improved milling machine constructed in such novel manner as to comprise comparatively few parts, enabling production of the machine at a low cost and at the same time permitting adaptation of the machine to a wide range of feed variations. Thus, with but a small machine investment, the same milling operations may be obtained in a practical way as heretofore have required the use of more expensive machines.

Another object of my invention is to provide what might be termed a bench milling machine, that is, one so constructed that it may be mounted on a work bench or any suitable support, making it convenient to load and unload, and also adapted to arrangement in a series or battery so that one operator may attend to a number of machines, thus expediting and lowering the cost of the milling operations.

I have also aimed to provide a milling machine characterized by certain novel principles, such for example as the mounting of the cutter spindle on a carriage which is adapted to be reciprocated with respect to the work-supporting table and the provision of mechanism carried by the carriage and operated by the spindle or the spindle drive for reciprocating the carriage. In this regard, I have also aimed to provide a novel mechanism for transmitting the reciprocating movement, including a rotary cam on the tool spindle carriage adapted for imparting the feed movement and for controlling in general the back and forth movement of the carriage.

Still another object is to provide a novel feed mechanism whereby feed of the cutter is automatically accelerated in proportion to the cutting load, thus doing the work in less time than would be required with constant feed mechanisms in general use.

Other objects and attendant advantages will be appreciated by those familiar with this art as the invention becomes better understood by reference to the following description when considered in connection with the accompanying drawings, in which—

Figure 1 is a plan view of a milling machine embodying my invention;

Fig. 2 is a front elevation of the machine, partly in section;

Fig. 3 is a plan view of the machine showing the tool carriage moved to the end of its feed movement;

Fig. 4 is a detail section taken substantially on the line 4—4 of Fig. 3, illustrating the feed accelerating device in the position when either starting or finishing the cut;

Fig. 5 is a similar section showing said device under substantially maximum compression; and Figs. 6 and 7 are diagrammatic views showing the position of a cutter at different periods in the feed, substantially corresponding to the positions of the feed accelerating device in Figs. 4 and 5, respectively.

While I have in the present example shown the machine as designed to be supported upon a bench 11, it should be understood that I have merely illustrated a preferred embodiment, and that any suitable base or support might be provided. In the present instance, the base of the machine designated generally by 12, is of rectangular shape and constitutes an oil and chip pan. A suitable work-supporting table 13 mounted on ways 14 on the base, is adapted to be adjusted in a horizontal plane by means of the screw 15 as is well understood in this art. The base 12 carries vertical guideways 16 upon which a tool carriage supporting bed 17 is mounted. It will be observed that the bed 17, disposed in a horizontal position and reaching substantially from end to end of the base with one end disposed adjacent to the work table, is adapted to be vertically adjustable on the ways 16 by operation of the screw 18.

A tool spindle carriage 19 is mounted on suitable ways on the bed 17 to slide back and forth thereon in a horizontal plane and carries a cutter spindle 21 on a horizontal axis transverse to the plane in which the carriage is reciprocable. The tool spindle may be of any suitable or preferred construction adapted for carrying milling cutters of various sizes and shapes, such for example as the cutter 22, and may be suitably journaled on the carriages. In the present example, the spindle is journaled in ball bearings, not shown. The details of the spindle mountings have not been illustrated as they are not important to the present invention, especially inasmuch as any of various well known constructions and mountings might be employed. It will be noted, however, that a belt pulley 23 is mounted concentric with the spindle 21 and has a direct driving connection therewith. This pulley is adapted to be driven by power from any suitable source.

The mechanism for imparting feed movement to the carriage is mounted directly upon and carried by the tool carriage and the thrust of such mechanism is taken by a stationary part, such as the bed 17. My invention contemplates the provision of novel mechanism for reciprocating the carriage, which mechanism shall preferably be driven from the tool spindle or from the same source of power or driving element on the carriage employed for driving the spindle. The immediate means for imparting the feed movement consists of a cam designated generally by 24 mounted on the carriage 19 to revolve about a vertical axis, and a follower roller 25 carried as will be presently more fully described, by the bed 17. The cam is fixed to and concentric with a worm gear 26 adapted to be revolved by a worm 27 fixed to a shaft 28 journaled in suitable bearings on the carriage 19. The worm shaft and consequently the cam 24 is driven from the tool spindle through the agency of a pair of intermeshing gears 29. By removal of these gears 29 and the substitution of another set of different diameters, the speed ratio between the spindle and the cam may be changed. The inclined gear 31 meshing with the worm 27 is simply for purpose of oiling, it being observed that its low end dips in an oil reservoir formed in the top of the tool carriage. Any suitable means, such as contractile springs 32 or the equivalent, may be employed for moving the tool carriage to the right, viewing Fig. 2, in which to retract or return the carriage to its normal or starting position. Movement of the tool carriage in this direction is stopped by contact of the lugs 33 (fixed to the carriage) against nuts 34 adjustable on threaded rods 35 fixed with respect to the bed 17. As shown in Figs. 1 and 2, the lugs 33 are held against the stops 34, thereby determining the starting position of the carriage. It will be manifest from the foregoing that when the cam 24 is revolved in a counter-clockwise direction viewing Fig. 1, the spiral cam surface 36 will be brought into contact with the roller 25, which being held in a substantially stationary position will cause the tool carriage to be fed to the left at a speed controlled by the R. P. M. of the cam and the pitch or shape of its cam surface. When the point 37 is passed, the springs 32 will function to return the carriage in a quick movement. It will be noted that the worm gear 26 which revolves the cam has a mutilated portion 30 normally out of contact with the worm 27. To start the cam it is necessary to initially move the gear 26 by hand or by any suitable device to engage the teeth of the worm gear with its worm. When the worm gear has made a complete revolution the blank portion 30 will be brought opposite the worm, thereby disconnecting the drive. A complete worm gear may be employed in place of the mutilated gear, in which case the cycle of operation would be continuously repeated.

Referring now to the mounting of the cam roller 25, it will be observed that it is carried by a bolt 38 at one end of a slide 39, which is mounted on the supplemental bed part 41 on suitable ways for movement in a horizontal plane. The supplemental bed part 41 may be adjusted lengthwise on the bed 17 by means of the screw adjustment 42 and may be locked in any adjustable position by the gib clamp 43. The slide 39 may likewise be locked on the bed part 41 by operation of the gib clamp 44, gib locks of this kind being well known in this art. In the normal operation of the machine, the gib clamp 43 is locked to hold the bed part 41 in rigid relation to the bed 17 and the clamp 44 is released, leaving the slide 39 free to move lengthwise on the bed part 41. The slide 39 is shaped to house one or more coil compression springs 45, each of which bears at one end against the slide and at its opposite end against a plunger 46 having a screw end 47 threadingly engaged in an end plate 48 fixed to the bed part 41. The slide 39 carries a threaded rod 49 which passes loosely through an opening in the plate 48 and is equipped with a nut 51 adapted by contact against said plate for limiting movement of the slide to the left under pressure of the springs 45. It will thus be seen that the roller 25 is yieldingly supported on the bed 17, with capacity for limited sliding movement in one direction against the pressure of the springs and limited by contact of the slide against the end plate 48, and in the opposite direction under the influence of the spring pressure until limited by the stop 51.

The operation is as follows: Assuming the work piece 52 suitably clamped or otherwise secured on the table 13 and the spindle continuously revolving in a clockwise direction viewing Fig. 2, the operator will engage the worm gear 26 with the worm 27 as above described, thereby causing the cam to be revolved. It will be manifest that the cam may be of any suitable shape to give the requisite feed movement for any particular job. In the present example, the cam is detachable from the worm gear and may be replaced by another cam of a different shape if the condition of the work requires. In practice, a series of cams are provided for different feeds and for special jobs as the case may be. The cam shown in the drawings is designed to feed the cutter forwardly at a uniform speed. As the cutter is fed into the work the roller will gradually retract, due to the increasing resistance being greater than the pressure of the springs 45, until the maximum cutting load is reached, as shown in Fig. 7. At this time the load will either be carried entirely through the springs 45 as shown in Fig. 5, or in the event that the spring pressure in the particular adjustment of the parts is not equal to the maximum load the slide will be forced back against the plate 48 and the feed will be direct from the cam. When the advanced point of the cut reaches the end 53 of the work piece as shown in Fig. 7, the resistance to the cutter diminishes and the stored up pressure in the springs will be utilized to accelerate the lineal travel of the cutter, thereby feeding the cutter through the remainder of the work piece at an accelerating speed. By reason of this feed mechanism, the cutter may be operated at its maximum cutting speed at all times, it being noted that the feed varies in proportion to the load. It follows that I am able to operate the milling machine at a higher speed on any given job than is possible with the ordinary milling machine having a uniform feed. It should also be noted that the acceleration is in the feed proper and should not be confused with the ordinary rapid approach movement between the cutter and the work which may be obtained in the present example by shaping the cam to this end. The feed varies in the present case automatically in proportion to the load. By adjustment of the members 47, the spring pressure may be increased or diminshed, and likewise the range of movement of the slide 39 may be regulated by the nut 51 to secure the most efficient results under any given condition. It will be noted that a variable cutter feed is obtained from a constant spindle speed. By reason of the principles herein disclosed, I am enabled to provide a very efficient milling machine, the capacity of which although limited, is adapted for a wide range of work requiring straight milling operations. Machines of this character may also be used in place of the larger and more expensive milling machines now in general use when the job does not require more than a straight milling operation.

It is believed that the foregoing conveys a clear understanding of the principles and objects prefaced above, and while I have illustrated and described but one working embodiment, it should be understood that considerable change might be made in the construction and arrangement without departing from the spirit and scope of the invention as expressed in the appended claims.

I claim:

1. In a milling machine, the combination of a work-supporting table, a reciprocable tool carriage, a cutter spindle journaled on said carriage, a rotary cam mounted on the carriage, a member engaging the cam and supported in connection with a stationary part of the machine, and means for revolving the cam, the cam being shaped to impart feed movement to the carriage.

2. A milling machine comprising a base, a tool carriage supporting bed vertically adjustable on the base, a work table horizontally adjustable on the base toward and from said bed, a tool spindle carriage mounted to reciprocate horizontally on said bed and equipped with a tool spindle, means for revolving the spindle, and means carried by the carriage and co-operating with the bed for reciprocating the carriage on the bed.

3. A milling machine comprising a base, a tool carriage supporting bed vertically adjustable on the base, a work-supporting table mounted for horizontal adjustment on the base, a tool spindle carriage mounted to reciprocate horizontally on the bed and equipped with a spindle, a supplemental bed part on said bed, means for rotating the spindle, and mechanism mounted on the carriage and co-operating with said supplemental bed part for reciprocating the carriage.

4. In a milling machine, the combination of a work-supporting table, a reciprocable tool spindle carriage, a tool spindle journaled on the carriage, a rotary cam on the carriage, gearing between the spindle and the cam for imparting rotary motion to the latter, and a cam-engaging member co-operating with a stationary part of the machine for taking the thrust of the cam and thereby causing the carriage to be moved in a feed movement when the cam is revolved.

5. In a milling machine, the combination of a work table, a reciprocable tool spindle carriage, a tool spindle journaled on the carriage, a rotary cam mounted on the carriage, means for revolving the spindle, means for imparting rotary motion to the cam, and a cam-engaging member yieldingly mounted in connection with a stationary part of the machine for causing the carriage to be variably moved by the cam action.

6. In a milling machine, the combination of a work-supporting table, a reciprocable tool spindle carriage, a tool spindle on the carriage, a rotary cam on the carriage, a cam-engaging member, yieldable means interposed between said member and a stationary part of the machine, and means for revolving the cam, whereby the cam thrust will be yieldingly resisted by said member, causing the carriage to be moved in a variable feed movement.

7. In a milling machine, the combination of a work-supporting table, a reciprocable tool spindle carriage, a tool spindle on the carriage, a rotary cam on the carriage, a slide movably mounted in connection with a stationary part of the machine and equipped with a roller cooperating with the cam, a spring operative between the slide and said stationary part of the machine, and means for imparting rotary motion to the cam, whereby to feed the tool carriage in a variable feed movement.

8. In a milling machine, the combination of a work-supporting table, a reciprocable tool spindle carriage, a tool spindle on the carriage, a rotary cam on the carriage, a slide movably mounted in connection with a stationary part of the machine and equipped with a roller co-operating with the cam, a spring operative between the slide and said stationary part of the machine, means for imparting rotary motion to the cam, whereby to feed the tool carriage in a variable feed movement, and means for varying the pressure of said spring.

CHARLES F. HENRY.